United States Patent
Ozaki

(10) Patent No.: US 8,390,846 B2
(45) Date of Patent: Mar. 5, 2013

(54) APPARATUS FOR CONTROLLING AN IMAGE-PROCESSING DEVICE, COMPUTER IMPLEMENTED METHOD FOR UPDATING AN ITEM OF CONFIGURATION INFORMATION FOR CONTROLLING AN IMAGE-PROCESSING DEVICE, COMPUTER-READABLE STORAGE MEDIUM, AND MEANS FOR CONTROLLING AN IMAGE-PROCESSING DEVICE

(75) Inventor: Hiroshi Ozaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1171 days.

(21) Appl. No.: 12/098,207

(22) Filed: Apr. 4, 2008

(65) Prior Publication Data

US 2008/0266598 A1 Oct. 30, 2008

(30) Foreign Application Priority Data

Apr. 24, 2007 (JP) ................................. 2007-114423

(51) Int. Cl.
*G06F 3/12* (2006.01)
*G06K 15/00* (2006.01)

(52) U.S. Cl. ..................... 358/1.15; 358/1.13; 358/1.18; 358/1.16

(58) Field of Classification Search ................... 358/1.1, 358/1.13, 1.14, 1.15, 1.16, 1.17, 1.18, 1.2, 358/1.6, 1.9, 1.11, 407, 468; 347/2, 3, 5, 347/14, 23; 399/1, 8, 9, 38; 710/8, 10, 15, 710/17, 64, 72
See application file for complete search history.

(56) References Cited

U.S. PATENT DOCUMENTS

| 5,500,715 | A | 3/1996 | Ta et al. |
| 2002/0089683 | A1 | 7/2002 | Moro et al. |
| 2002/0161936 | A1 | 10/2002 | Minagawa |
| 2006/0109336 | A1 | 5/2006 | Park |
| 2006/0200420 | A1* | 9/2006 | Osada ............................. 705/59 |
| 2006/0216054 | A1 | 9/2006 | Willis |

FOREIGN PATENT DOCUMENTS

| JP | 2002-044344 A | 2/2002 |
| JP | 2004-199471 A | 7/2004 |
| JP | 2007-011946 | 1/2007 |
| KR | 10-2006-0056794 A | 5/2006 |

OTHER PUBLICATIONS

"How to troubleshoot printing problem in Word 2002 (Part I)", 12 pgs., http://support.microsoft.com/kb/291336.

* cited by examiner

*Primary Examiner* — Dov Popovici
(74) *Attorney, Agent, or Firm* — Carter, DeLuca, Farrell & Schmidt LLP

(57) ABSTRACT

From an image-processing apparatus that can communicate via a network, updated configuration information is received, and configuration information for display is not updated based on the received configuration information so that an item to be processed is not reflected in configuration information of an item manually set by a user, and the configuration information for display is updated based on the received configuration information so that an item to be processed is reflected in the configuration information of an item that is not manually set by the user. Accordingly, the configuration information can be manually set while effectively using the configuration information received from the information-processing apparatus.

9 Claims, 10 Drawing Sheets

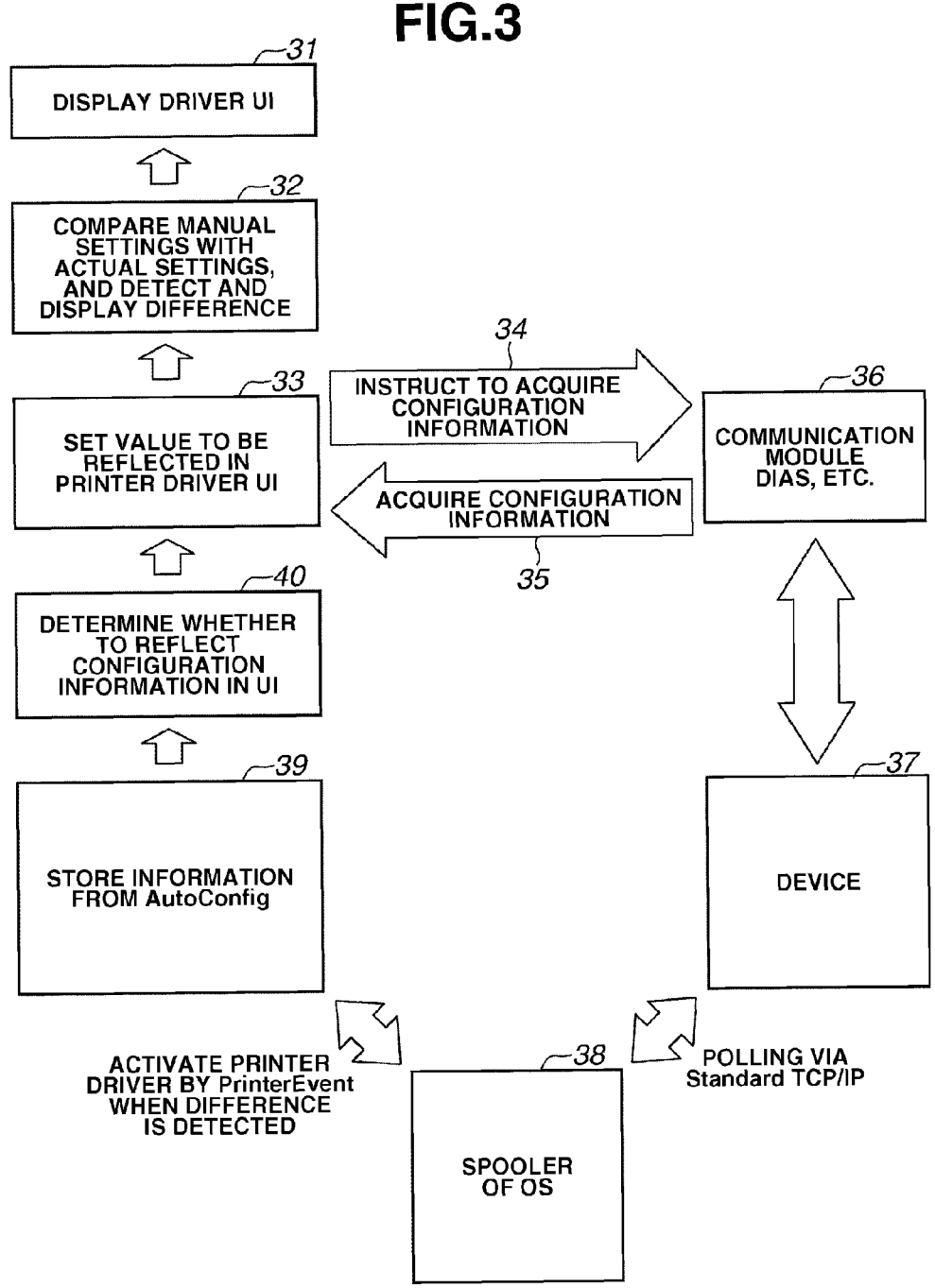

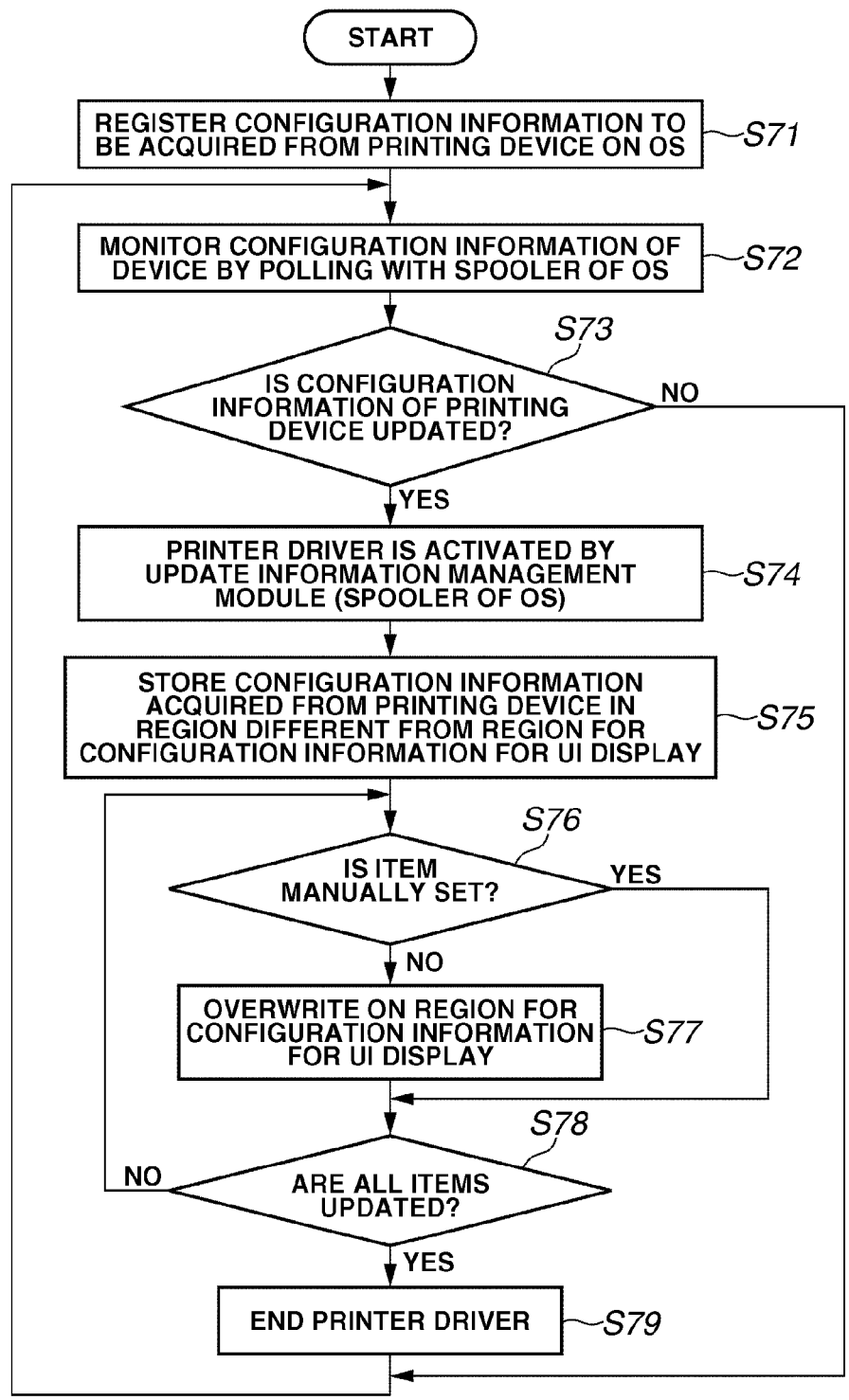

APPARATUS FOR CONTROLLING AN IMAGE-PROCESSING DEVICE, COMPUTER IMPLEMENTED METHOD FOR UPDATING AN ITEM OF CONFIGURATION INFORMATION FOR CONTROLLING AN IMAGE-PROCESSING DEVICE, COMPUTER-READABLE STORAGE MEDIUM, AND MEANS FOR CONTROLLING AN IMAGE-PROCESSING DEVICE

BACKGROUND OF THE INVENTION

1. Field of the Invention

The present invention relates to means for controlling an image-processing device and computer implemented method for updating an item of configuration information.

2. Description of the Related Art

Printer drivers are software for causing application software running on an operating system (OS) to instruct a printing device such as a printer to perform print processing. The printer drivers enable various print mode settings, for example, selection of a paper-feed cassette corresponding to a printing-device configuration, setting of a color processing method, and selection of a paper discharge method. The printer drivers have user interfaces (UI) for managing configurations of printing devices, and can set configurations corresponding to actual installation conditions and usage conditions. Japanese Patent Application Laid-Open No. 2002-44344 discusses a technique for automatically acquiring configuration information of a printing device in response to a request from a printer driver.

As the methods for setting configuration information of printing devices, there are two methods. One method is to manually set configuration information using options provided on a printer driver UI. The other method is to acquire configuration information from a printing device and automatically reflect the information in a printer driver UI. The printer driver performs control so that only functions that can be realized according to the setting of the configuration information, can be selected. Therefore, the printing is performed as instructed by a user.

The manual setting is used in a case where a printing device and a printer driver cannot perform two-way communication with each other and configuration information cannot be acquired from the printing device, so that a user needs to manually set the configuration information. In addition, the manual setting is used for the following purposes.

For example, an environment for generating print data differs from an environment for executing printing, and in respective environments, configuration information of printing devices differ from each other. In the environment for generating the print data, it is enough if an inexpensive paper-discharge device that can perform test printing is provided. However, in the environment where the actual printing is performed, an expensive paper-discharge device that has a bookbinding function and the like is required. In such an environment for generating print data, printing is performed using the application software that generates the document, and the print data is generated as a file without sending the print data generated by a printer driver to the printing device. The generated file is moved to the environment for performing printing and the printing is executed.

In this case, the printing device in the environment for generating print data may not have the same paper-discharge device as the printing device used in the environment for performing printing. Accordingly, it is not possible to select on the printer driver the functions that can be performed only by the paper-discharge device. As a result, it is not possible to generate print data that specifies configuration including a paper discharge method. In order to solve the problem, it is necessary to manually set the configuration information that is different from the actual configuration.

Further, in a case where the paper-discharge device is mounted but the use of the device is not allowed in light of authority, or in a case where the paper-discharge device is broken and the use should be regulated, it is also necessary to manually set the configuration information that is different from the actual configuration.

In the above-described cases, a part of the configuration information is manually set. However, if a function for automatically notifying a printer driver of change in the configuration from the printing device and changing configuration information settings on a UI is mounted, even if the setting of configuration information different from the actual configuration information is manually performed, the setting is automatically changed. In order to solve the problem, it is possible to prevent the printing device from conducting update in a case where the manual setting is performed. However, in this case, all information including information to be automatically acquired from the printing device is stopped. Further, if manual setting/automatic setting is provided for each item, configuration of the printer driver UI becomes complicated.

SUMMARY OF THE INVENTION

The present invention is directed to enabling common use of manually set configuration information and configuration information from an information-processing apparatus.

According to an aspect of the present invention, an apparatus for controlling an image-processing device includes a configuration-information setter to set an item of configuration information for controlling operation of the image-processing device, which configuration information setter is operable by a user to manually set an item of configuration information, and operable to automatically set an item of configuration information based on update information received from the image-processing device, and an updater configured to automatically set the item of configuration information using the configuration-information setter in the case of receipt of update information from the image-processing device, except in the case that the item of information is currently manually set.

According to another aspect of the present invention, a computer implemented method for updating an item of configuration information for controlling an image-processing device, which item of configuration information may be manually set by a user, or automatically set based on update information received from the image-processing apparatus, includes automatically setting the item of configuration information in the case of receipt of update information from the image-processing device except in the case that the item of information is currently manually set.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a view illustrating a method of sending and receiving configuration information between a printer and a printer driver, and managing the configuration information according to the first exemplary embodiment of the present invention.

FIG. 7 is a flowchart illustrating an example of an updating processing of configuration information according to the first exemplary embodiment of the present invention.

DETAILED DESCRIPTION OF THE EXEMPLARY EMBODIMENTS

Embodiments of the invention will be described in detail below with reference to the drawings.

Figure 1:
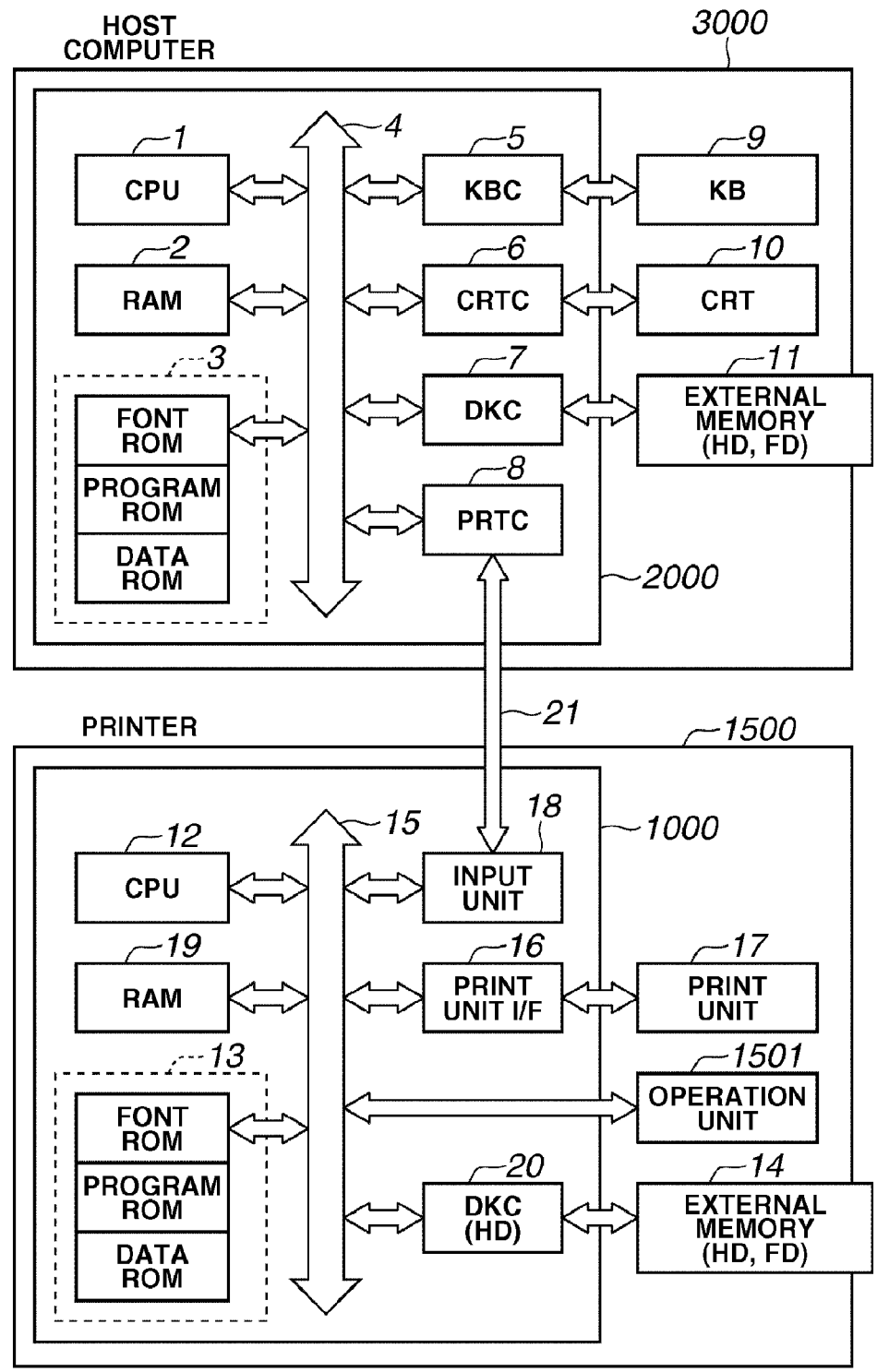
FIG. 1 is a block diagram illustrating a configuration of a printer control system according to a first exemplary embodiment of the present invention.

FIG. 1 is a block diagram illustrating a configuration of a printer control system according to a first exemplary embodiment of the present invention. As illustrated in FIG. 1, the printer control system includes a host computer 3000, which is an example of an information-processing apparatus, and a printer 1500 that can communicate with the host computer 3000 via a network. Unless otherwise noted, as long as functions according to the first exemplary embodiment are performed, a single apparatus, a system including a plurality of apparatuses, or a system that connects the apparatuses and performs processing via a network such as a local area network (LAN) or wide area network (WAN), can be employed.

In FIG. 1, the host computer 3000 includes a central processing unit (CPU) 1. The CPU 1 processes mixed documents including drawings, images, characters, tables (including table calculation), and the like based on a document processing program stored in a read-only memory (ROM) for program in a ROM 3 or an external memory 11. Further, the CPU 1 controls entire devices connected to a system bus 4. The program ROM in the ROM 3 or the external memory 11 stores an operating system program (hereinafter, referred to as OS) that controls the CPU 1. The program ROM in the ROM 3 or the external memory 11 stores font data that is used in the document processing. The program ROM in the ROM 3 or the external memory 11 further stores various data that is used in the document processing.

A random access memory (RAM) 2 functions as a main memory or a work area of the CPU 1. A keyboard controller (KBC) 5 controls key input from a keyboard 9 or a pointing device (not shown). A cathode ray tube (CRT) controller (CRTC) 6 controls display of a CRT display (CRT) 10. A disk controller (DKC) 7 controls access to the external memory 11 such as a hard disk (HD), and a flexible disk (FD). The external memory 11 stores a boot program, various applications, font data, a user file, an editing file, a printer control command generation program (hereinafter, referred to as printer driver), and the like.

A printer controller (PRTC) 8 connects the host computer 3000 to the printer 1500 via a predetermined two-way interface (interface) 21, and performs communication control with the printer 1500.

The CPU 1 performs a rasterizing processing of outline fonts to a display information RAM that is set in the RAM 2, and enables "What You See Is What You Get (WYSWYG)" on the CRT 10. Further, based on a command on the CRT 10 that is specified using a mouse cursor (not shown), the CPU 1 opens various registered windows, and performs various data processing. In the execution of the printing, the user can open a window for print settings, and set a printer and a print processing method to a printer driver that includes selection of a print mode.

In the printer 1500, a CPU 12 performs the following processing (control) based on a control program stored in a program ROM in a ROM 13 or a control program stored in an external memory 14. That is, the CPU 12 outputs an image signal as output information to a print unit (printer engine) 17 that is connected to a system bus 15.

The program ROM in the ROM 13 stores a control program of the CPU 12. A font ROM in the ROM 13 stores font data that is used in generating the output information. A data ROM in the ROM 13 stores information used in the host computer in a case where a printer does not have the external memory 14 such as a hard disk.

The CPU 12 can perform a communication processing with the host computer 3000 via an input unit 18, and can notify information in the printer to the host computer 3000.

A RAM 19 functions as a main memory or a work area of the CPU 12. Users can extend a memory capacity by an optional RAM that can be connected to an expansion port (not shown). Further, the RAM 19 can be used for an output information rasterizing region, an environment data storage area, a nonvolatile random access memory (NVRAM), or the like.

Access to the external memory 14 such as a hard disk (HD) or an integrated circuit (IC) card is controlled by a memory controller (MC) 20. The external memory 14 is optionally connected, and stores font data, an emulation program, and form data.

The input unit 18 includes a switch and a light emitting diode (LED) indicator for operation in the operation panel. The number of the above-described external memories is not limited to one, but at least one external memory is provided. Further, a plurality of the external memories that store optional font cards, programs for interpreting printer control languages of different language systems in addition to the built-in fonts can be connected to the printer 1500. Further, the printer 1500 can have a NVRAM that stores printer mode setting information from an operation unit (operation panel) 1501.

Figure 2:
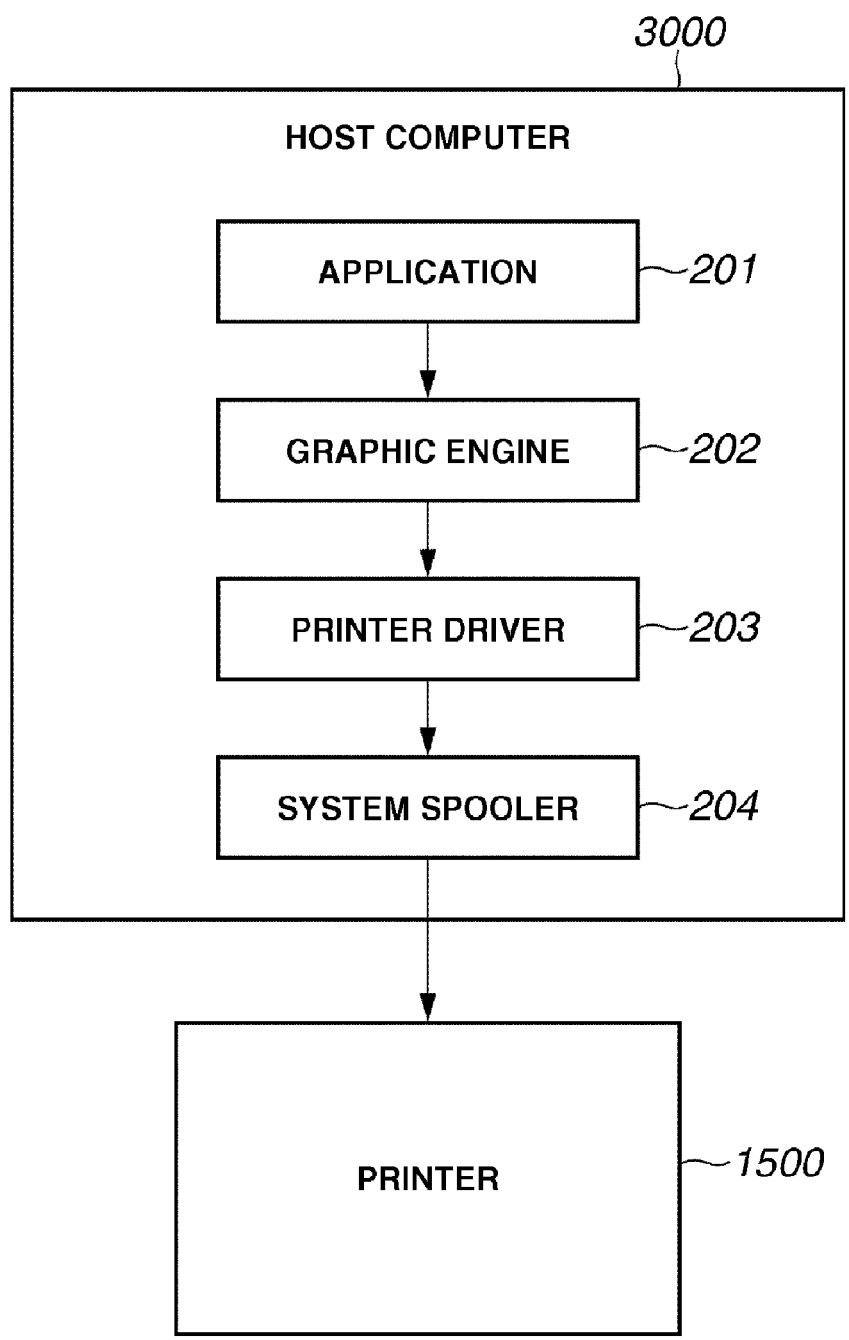
FIG. 2 is a view illustrating a functional configuration of print processing in a host computer according to the first exemplary embodiment of the present invention.

FIG. 2 is a view illustrating a functional configuration with respect to print processing in the host computer 3000 according to the first exemplary embodiment of the present invention. Program modules 201 to 204 are files stored in the external memory 11. The program modules are loaded by the OS or a module using the program modules, in the RAM 2 for execution.

An application 201 and a printer driver 203 can be added to the HD of the external memory 11 via the FD of the external memory 11, a compact disk read only memory (CD-ROM) (not shown), or a network (not shown). The application 201 stored in the external memory 11 is loaded in the RAM 2 and executed. However, in a case where printing is performed from the application 201 to the printer 1500, an output (drawing) is performed using a graphic engine 202 that is similarly loaded in the RAM 2 and executable.

The graphic engine 202 loads the printer driver 203 provided for each printing device (printer) from the external memory 11 into the RAM 2, and converts an output of the application 201 into a control command of the printer using the printer driver 203. The converted printer control command is output to the printer 1500 via a system spooler 204 that is loaded in the RAM 2 by the OS, and via the interface 21.

FIG. 3 is a view illustrating a method of sending and receiving configuration information between the printer 1500 and the printer driver 203, and managing the configuration information. There are two types of methods for acquiring configuration information of a printing device (printer 1500 or device 37). The configuration information includes information of a paper-feed device that can be optionally mounted on the printing device, paper-discharge device information, installed-memory information, setting information of the printing device, parameter information for image processing, loaded-paper information, function version information indicating supported functions, and the like. More specifically, the configuration information includes items corresponding to the above-described information and specific values (information) corresponding to these items.

A first method is triggered when a configuration information acquisition instruction 34 is issued by a user using a printer driver UI displayed on the CRT 10. In this case, the information is requested from the device 37 by a command sent using a communication module 36 that realizes two-way communication between the printer driver 203 and the device 37.

The printer driver 203 acquires the information (configuration information acquisition 35) from the device 37 via the communication module 36, and stores the information as a set value 33 for reflecting the information in the printer driver UI.

In this method, the configuration information update is performed only once when instructed by the user, and configuration information change of the device performed after the update is not updated.

The other method uses a function provided by the OS. In this method, a configuration information list to be acquired from the device is registered from the printer driver 203 in the OS in advance. According to the list, polling is performed to the device at the OS side to monitor the configuration information. The polling is performed by a spooler 38 (system spooler 204) of the OS to the device 37. If the configuration information (MIB values) registered from the printer driver 203 is changed, the printer driver 203 is activated by PrinterEvent. The spooler 38 of the OS notifies the printer driver 203 of the latest configuration information of the device.

If the latest configuration information is, for example, overwritten on the set value 33 to be reflected in the printer driver UI by the printer driver 203, configuration information that is manually set in the printer driver UI is also updated. Accordingly, in the first exemplary embodiment, for example, the printer driver 203 temporarily stores the latest configuration information on a region (indicated by reference numeral 39 in FIG. 3) that is different from a region for the printer driver UI. Then, for example, the printer driver 203 determines whether a manual setting is performed (indicated by reference numeral 40 in FIG. 3). The printer driver 203 updates exclusively a set value of an item on which the manual setting is not performed, to reflect the set value in the printer UI.

Figure 4A:
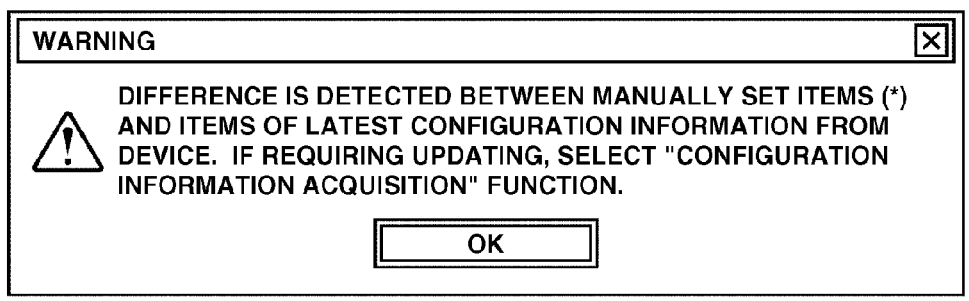
FIGS. 4A and 4B are views illustrating examples of UIs (screens) for warning according to the first exemplary embodiment of the present invention.

In the first exemplary embodiment, the printer driver 203 further determines whether a value which is determined to have been manually set and in which the latest configuration information is not yet reflected, exists (indicated by reference numeral 32 in FIG. 3). If the printer driver 203 determines that the value in which the latest configuration information is not yet reflected, exists, displays a UI illustrated in FIG. 4A on the CRT 10 to notify the user (indicated by reference numeral 31 in FIG. 3).

Further, the printer driver 203 detects a difference between the configuration information on the printer driver UI (configuration information set (or selected) on the printer driver UI) and the latest configuration information of the device at the time of printing. Based on the detected difference, if the printer driver 203 determines it is not possible to perform printing as specified by the user, the printer driver 203 displays a UI illustrated in FIG. 4B on the CRT 10.

Figure 5:
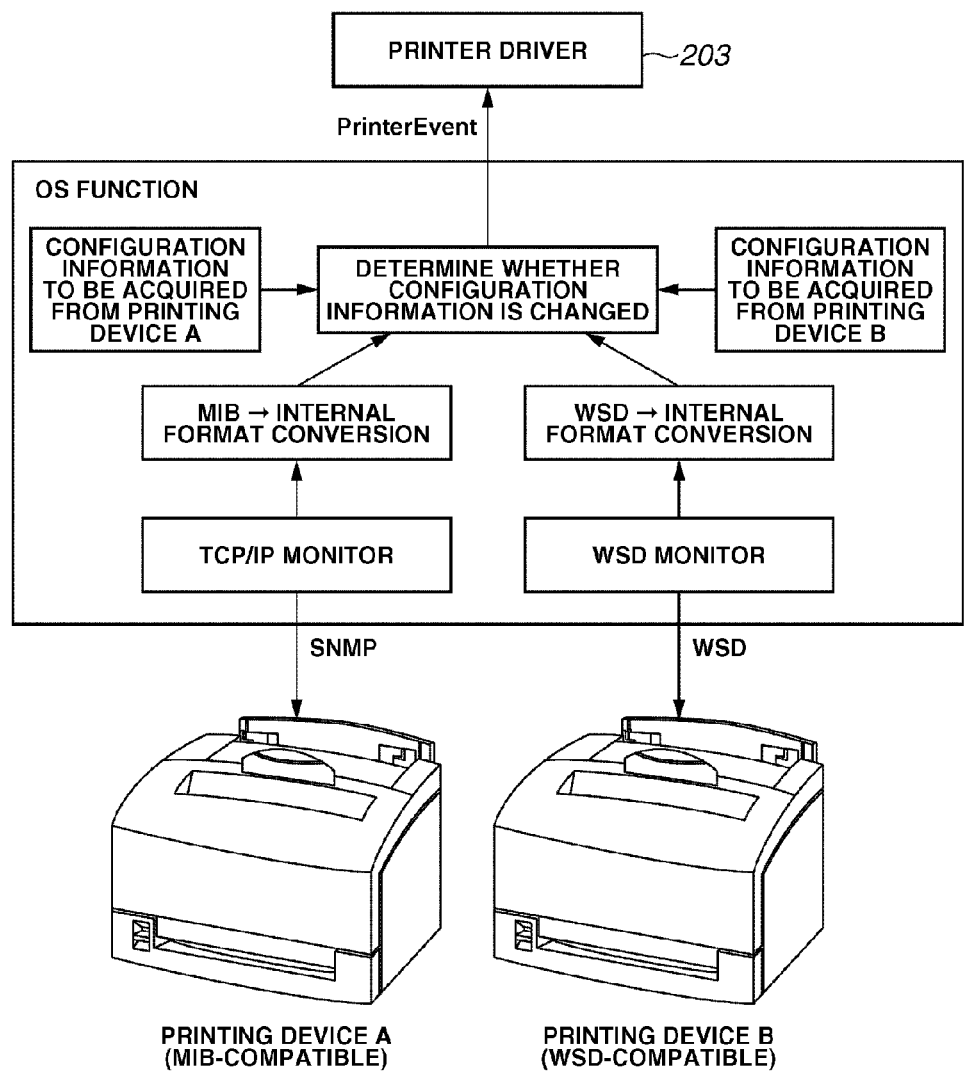
FIG. 5 is a view illustrating a method of acquiring configuration information of a printer by an OS according to the first exemplary embodiment of the present invention.

FIG. 5 is a view illustrating a method of acquiring configuration information of the printing device by the OS. Owing to a function provided by the OS, the configuration information of the printing device is acquired using a WEB Service for Device (WSD) monitor for a WSD compatible printing device, and a Transmission Control Protocol/Internet Protocol (TCP/IP) monitor for a WSD incompatible printing device. The user is required to register items to be acquired in the OS in advance according to a format specified by the OS. The acquired configuration information of the printing device is managed by the system spooler (spooler 204) in the OS. If a difference from prior acquisition information is detected, the system spooler 204 activates the printer driver 203 by PrinterEvent, and transmits, for example, the difference to the printer driver 203 using a format specified by the OS. The printer driver 203 analyses the information of the difference and reflects the information in the printer driver UI.

Figure 6A:
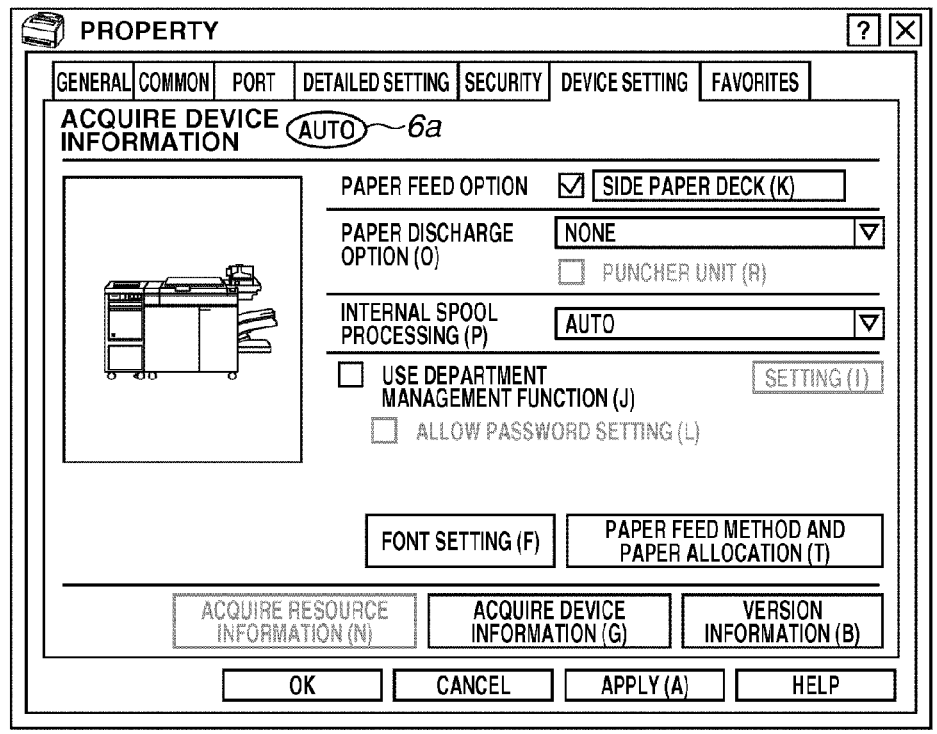
FIGS. 6A and 6B are views illustrating examples of printer driver UIs for setting configuration information of a printing device according to the first exemplary embodiment of the present invention.
Figure 6B:
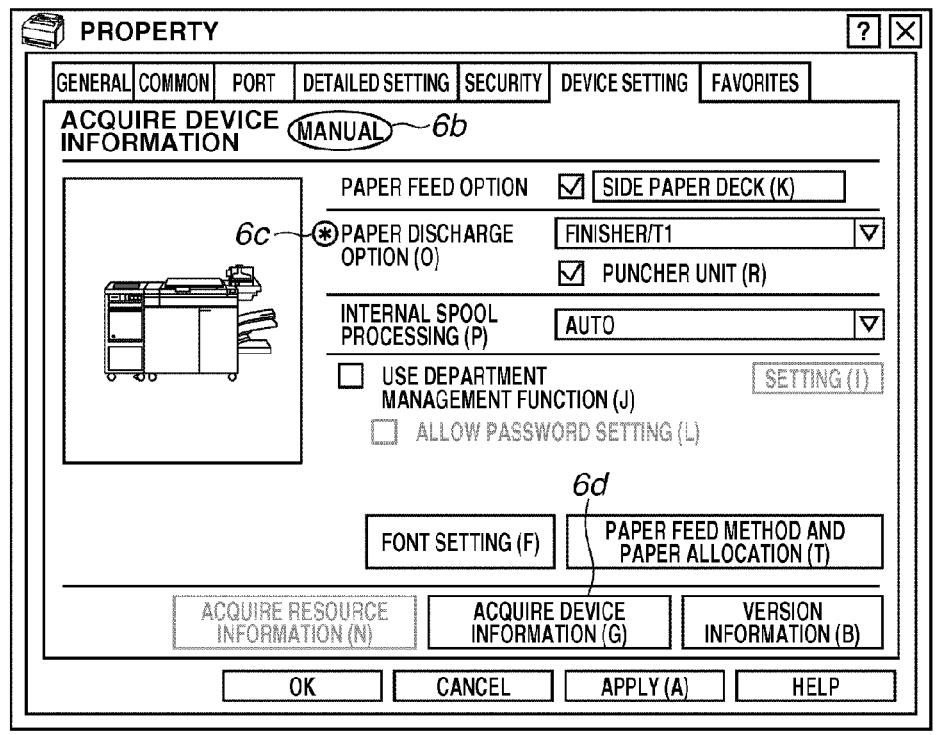

Next, a manual-setting-determination control is described. FIGS. 6A and 6B are views illustrating examples of printer driver UIs for setting configuration information of the printing device.

FIG. 6A illustrates an example of the printer driver UI when a manual setting is not performed by the user. In this case, as indicated by reference numeral 6a, a status of information acquisition is set to "auto". If a setting of a paper discharge option is changed on the UI from this state, as indicated by reference numeral 6b in FIG. 6B, the status is changed to "manual", and * mark (6c) is displayed for the manually set item. The * mark is an example, and other mark (sign) can also be used. Further, the manual setting can also be indicated by methods other than the method of using the mark, for example, by changing an attribute of a font.

In the first exemplary embodiment, the printer driver 203 considers the item that is manually changed from the automatic acquisition state as the manually set item, and changes the status to the manual acquisition state. In the manual acquisition state, if a "device information acquisition" key (6d) displayed on the printer driver UI is selected and configuration information of the printer can be adequately acquired, the printer driver 203 leaves the manual acquisition state and returns to the automatic acquisition state illustrated in FIG. 6A.

FIG. 7 is a flowchart illustrating an example of an updating processing of configuration information. In step S71, as described with reference to FIG. 5, the printer driver 203 instructs the OS to manage configuration information of the printing device. In response to the instruction, in step S72, the system spooler 204 starts to monitor the configuration information of the printing device.

In step S73, the system spooler 204 determines whether the configuration information of the printing device is changed. If it is determined that the configuration information of the printing device has been changed (YES in step S73), in step S74, the system spooler 204 activates the printer driver 203 with PrinterEvent. If the system spooler 204 determines that the configuration information of the printing device has not been changed (NO in step S73), the processing from step S72 is repeated.

In step S75, the activated printer driver 203 stores configuration information notified by the OS in a region (storage area) different from a setting storage area for printer driver UI display, as the latest information. That is, in the setting storage area, the configuration information for the printer driver UI is stored. The printer driver 203 stores the configuration information received from the printing device in the region different from the setting storage area.

In step S76, the printer driver 203, as described with reference to FIGS. 6A and 6B, determines whether the item to be processed has been manually set.

If the printer driver 203 determines that the item to be processed is the item that has been manually set (YES in step S76), the process proceeds to step S78. If the printer driver 203 determines that the item to be processed is not the item that has been manually set (NO in step S76), the process proceeds to step S77.

In step S77, the printer driver 203 overwrites a value (information) of the latest configuration information relating to the item to be processed in the setting storage area for the printer driver UI.

In step S78, the printer driver 203 determines whether the determination process in step S76 has been performed on entire items included in the configuration information. If the printer driver 203 determines that the determination process in step S76 has been performed on the entire items included in the configuration information (YES in step S78), in step S79, the printer driver 203 ends the processing. If the printer driver 203 determines that the determination process in step S76 has not been performed on the entire items included in the configuration information (NO in step S78), the processing from step S76 is repeated.

Figure 8:
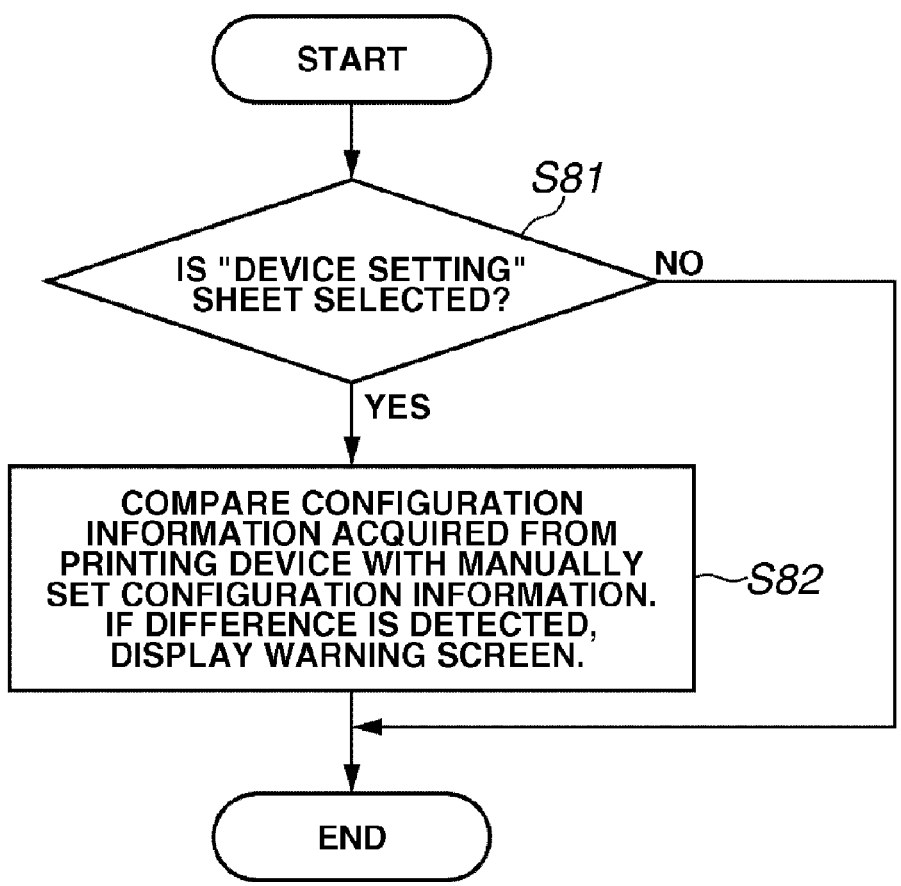
FIG. 8 is a flowchart illustrating an example of processing for displaying a warning screen according to the first exemplary embodiment of the present invention.

FIG. 8 is a flowchart illustrating an example of warning-screen-display processing. In step S81, the printer driver 203 determines whether a display of a "device setting" sheet is selected by a selection operation of the user using the printer driver UI. If the printer driver 203 determines that the display of the "device setting" sheet is not selected (NO in step S81), the processing illustrated in FIG. 8 is ended.

If the printer driver 203 determines that the display of the "device setting" sheet is selected (YES in step S81), in step S82, the printer driver 203 compares the set value of the manually set item with the value of the latest configuration information. If a difference is detected, the printer driver 203 displays the UI illustrated in FIG. 4A to notify the user that the item is manually set and the item has not been updated to the latest information.

Figure 9:
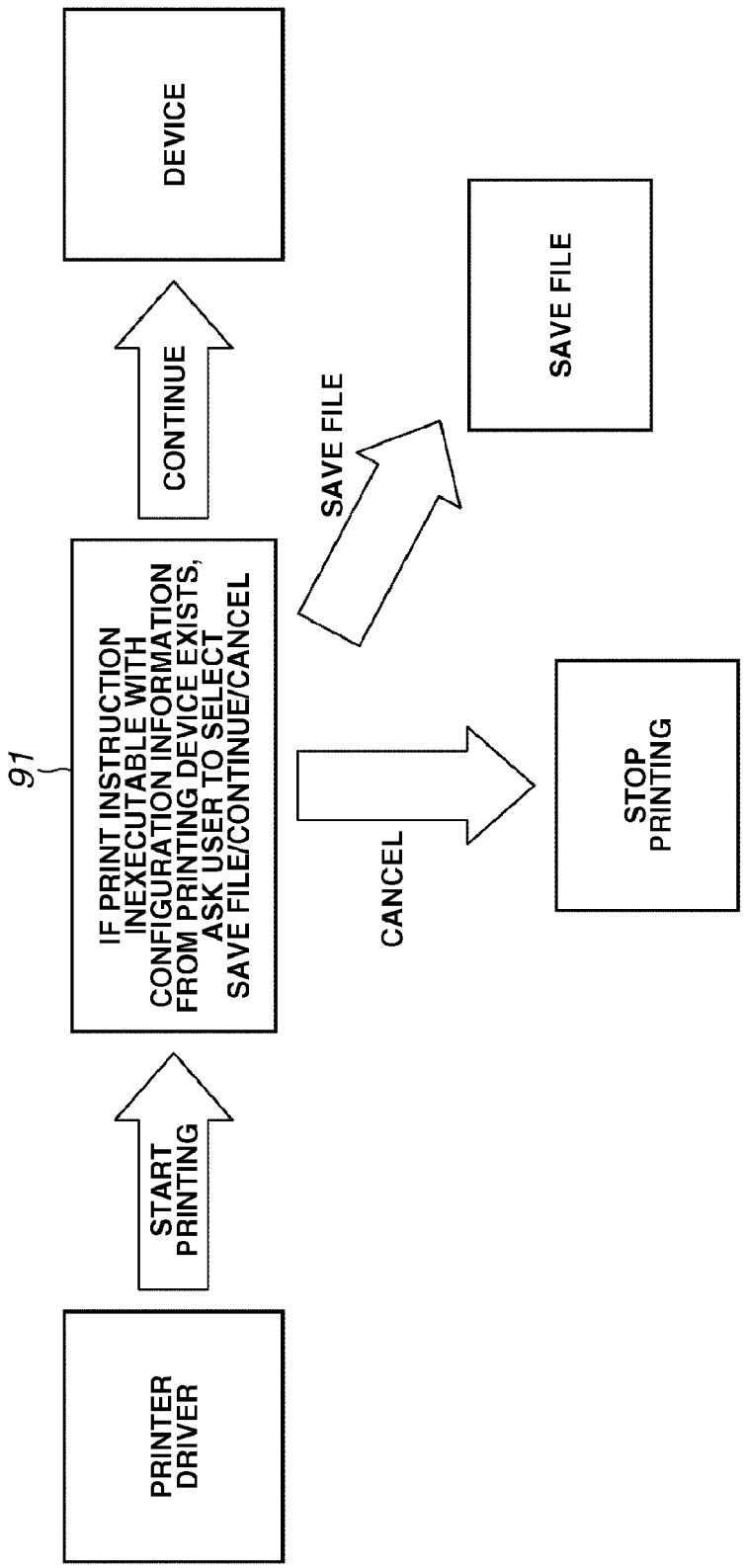
FIG. 9 is a view illustrating control for checking configuration information at the time of print execution and a print setting according to the first exemplary embodiment of the present invention.
Figure 10:
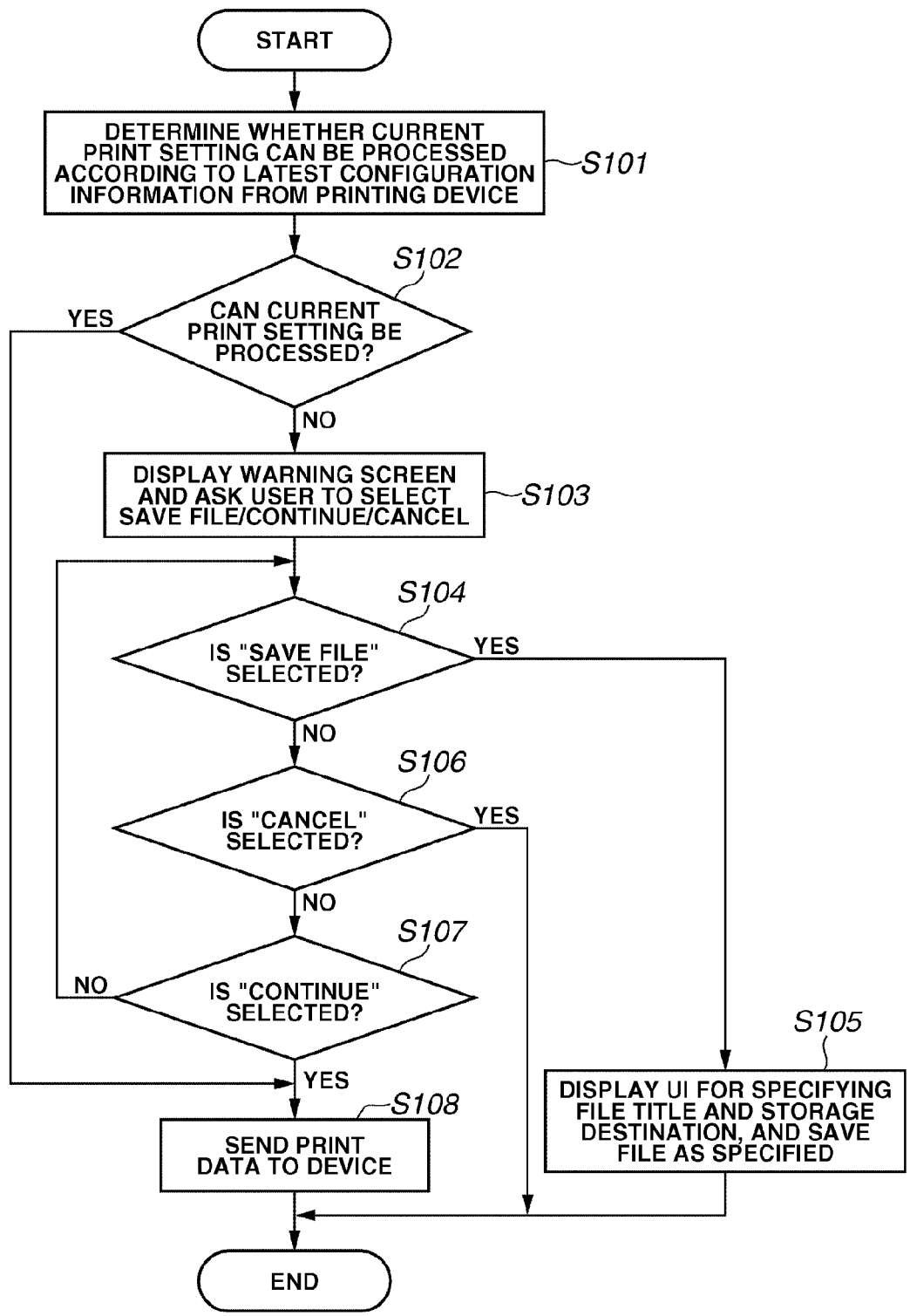
FIG. 10 is a flowchart illustrating an example of control processing for checking configuration information at the time of print execution and a print setting according to the first exemplary embodiment of the present invention.

A print-setting checking method when printing starts is described with reference to FIGS. 9 and 10. FIG. 9 is a view illustrating a checking control of configuration information in print execution and a print setting. FIG. 10 is a flowchart illustrating an example of control processing for checking the configuration information in print execution and the print setting.

According to the configuration information of the printing device, the printer driver 203 allows the user to select only executable functions. Accordingly, if there is a difference between the manually set configuration information and the actual configuration information of the printing device, the printing may not be performed as specified by the user. Then, as illustrated in FIG. 9, the printer driver 203 determines whether a print function that cannot be executed according to the latest configuration information, is set (indicated by reference numeral 91 in FIG. 9).

Figure 4B:
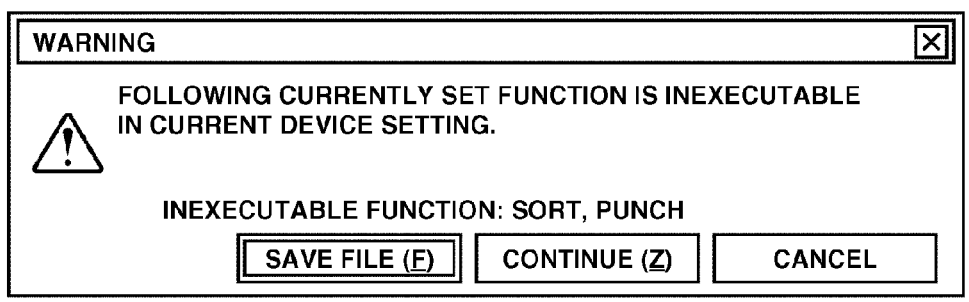

If the in executable function is set, the printer driver 203 displays the UI illustrated in FIG. 4B on the CRT 10 before issuing a print instruction to the printing device so that the user can select one of "SAVE FILE", "CANCEL", and "CONTINUE". Instead, the printer driver 203 can be configured to perform processing to automatically shut off the in executable function, or the like.

With reference to FIG. 10, the above-described control is described in detail. In response to the print start instruction (that is, when the printer driver 203 receives the request to start printing), in step S101, based on the manually set configuration information and the latest configuration information, the printer driver 203 determines whether the current print setting can be performed with the latest configuration information. If the printer driver 203 determines that the print setting can be performed (YES in step S102), in step S108, the printer driver 203 directly transmits print data to the printing device, and the printing is executed.

If the printer driver 203 determines that there is a print setting that cannot be performed (NO in step S102), in step S103, the printer driver 203 displays the UI illustrated in FIG. 4B on the CRT 10.

On the UI of FIG. 4B, if "SAVE FILE" is selected (YES in step S104), in step S105, the printer driver 203 displays a UI (not shown) for specifying a storage destination of the file, and save the print data in the specified location as a specified title.

If "CANCEL" is selected (YES in step S106) on the UI of FIG. 4B, the printer driver 203 stops the print processing.

If "CONTINUE" is selected (YES in step S107) on the UI of FIG. 4B, in step S108, the printer driver 203 directly transmits the print data to the printing device.

Other Exemplary Embodiments

The present invention can be implemented by the following methods. In an aspect of an exemplary embodiment of the present invention, a storage medium (or recording medium) that records a program code of software implementing the functions of above-described exemplary embodiment is provided to a system or a device. Central processing means (CPU or MPU) of the system or the device reads the program code stored in the storage medium and implements the program code. In this case, the program code read from the storage medium itself implements the functions of the above-described exemplary embodiment. Accordingly, the storage medium that records the program code constitutes the present invention.

Moreover, in another aspect of an exemplary embodiment of the present invention, the program code read by the central processing means of the system or the device is implemented. According to the instructions of the program code, an operating system (OS) running on the system or the device implements a part or the whole of the actual processing, and thus, the functions of the above described embodiment can be realized.

Moreover, in another aspect of an exemplary embodiment of the present invention, the program code read from the storage medium is written in a memory that is provided in a function enhancing card inserted in the system or the device or in a function enhancing unit connected to the system or the device. Then, based on the instructions of the program code, a CPU or the like provided in the function enhancing card or in the function enhancing unit implements a part or the whole of the actual processing. Thus, the function of the above-described embodiment can be realized.

In the case where an aspect of the present invention is applied to the storage medium, in the storage medium, a program code corresponding to the above-described flow-charts is stored.

As described above, according to the above-described exemplary embodiments, the latest information from a printing device is reflected exclusively in an item that is not manually set, and the latest information is not reflected in an item that is manually set. Further, by storing the latest configuration information received from the printing device separately from configuration information for printer driver UI, the information can be used to determine whether a setting in the printer driver differs from an actual setting of the printing device. Further, if a difference is detected, it is possible to notify a user that there is configuration information that is manually set by the user and has not yet been updated.

That is, according to the above-described exemplary embodiments, it is possible to commonly use the manually set configuration information and the configuration information received from the information-processing apparatus.

According to the exemplary embodiments of the present invention, the manually set configuration information can be set while effectively using the configuration information from the information-processing apparatus.

An embodiment of the invention provides an information-processing apparatus comprising: storage means configured to store configuration information for display; reception means configured to receive updated configuration information from an image-processing apparatus that can communicate via a network; and update means configured not to update the configuration information for display based on the configuration information received by the reception means so that an item to be processed is not reflected in configuration information of an item manually set by a user, and to update the configuration information for display based on the configuration information received by the reception means so that an item to be processed is reflected in the configuration information of an item that is not manually set by the user.

In a further embodiment there is provided a method for an information processing apparatus having storage means configured to store configuration information for display, the method comprising: receiving updated configuration information from an image processing apparatus that can communicate via a network; and not updating the configuration information for display based on the received configuration information so that an item to be processed is not reflected in configuration information of an item manually set by a user, and updating the configuration information for display based on the received configuration information so that the item to be processed is reflected in the configuration information of an item that is not manually set by the user.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-114423 filed on Apr. 24, 2007 which is hereby incorporated by reference herein in its entirety.

What is claimed is:

1. An information processing apparatus comprising:
a storage unit configured to store setting values for display;
an acquisition unit configured to acquire configuration information from an image processing apparatus; and
an update unit configured to update the setting values for display based on the configuration information so as to update a setting value for an item which is not manually set by a user but not to update a setting value for an item which is manually set by the user.

2. The information processing apparatus according to claim 1,
wherein the update unit updates the setting values for display based on the configuration information so as to update the setting values for items which are or are not manually set by the user, in a case where the configuration information is acquired from the image processing apparatus in accordance with an instruction from the user, and
wherein the update unit updates the setting values for display based on the configuration information so as not to update the setting value for the item which is manually set by the user but to update the setting value for the item which is not manually set by the user, in a case where the configuration information is acquired from the image processing apparatus by performing polling.

3. The information processing apparatus according to claim 1, further comprising
a display unit configured to display options whether to save a file, continue or cancel in a case where a function in accordance with the setting values for display is not executable based on the configuration information.

4. An information processing method comprising:
storing setting values for display;
acquiring configuration information from an image processing apparatus; and
updating the setting values for display based on the configuration information so as to update a setting value for an item which is not manually set by a user but not to update a setting value for an item which is manually set by the user.

5. The information processing method according to claim 4, wherein updating includes:
updating the setting values for display based on the configuration information so as to update the setting values for items which are or are not manually set by the user, in a case where the configuration information is acquired from the image processing apparatus in accordance with an instruction from the user; and
updating the setting values for display based on the configuration information so as not to update the setting value for the item which is manually set by the user but to update the setting value for the item which is not manually set by the user, in a case where the configuration information is acquired from the image processing apparatus by performing polling.

6. The information processing method according to claim 4, further comprising:

displaying options whether to save a file, continue or cancel in a case where a function in accordance with the setting values for display is not executable based on the configuration information.

7. A non-transitory computer-readable storage medium for storing a program, the program comprising instructions which, when executed by a computer, causes the computer to perform an information processing method comprising:
  storing setting values for display;
  acquiring configuration information from an image processing apparatus; and
  updating the setting values for display based on the configuration information so as to update a setting value for an item which is not manually set by a user but not to update a setting value for an item which is manually set by the user.

8. The non-transitory computer-readable storage medium according to claim 7, wherein updating includes:
  updating the setting values for display based on the configuration information so as to update the setting values for items which are or are not manually set by the user, in a case where the configuration information is acquired from the image processing apparatus in accordance with an instruction from the user; and
  updating the setting values for display based on the configuration information so as not to update the setting value for the item which is manually set by the user but to update the setting value for the item which is not manually set by the user, in a case where the configuration information is acquired from the image processing apparatus by performing polling.

9. The non-transitory computer-readable storage medium according to claim 7, wherein the information processing method further comprises:
  displaying options whether to save a file, continue or cancel in a case where a function in accordance with the setting values for display is not executable based on the configuration information.

* * * * *